United States Patent [19]

Kam et al.

[11] 4,086,378
[45] Apr. 25, 1978

[54] STIFFENED COMPOSITE STRUCTURAL MEMBER AND METHOD OF FABRICATION

[75] Inventors: Clifford Y. Kam; Vernon L. Freeman, both of Huntington Beach; Allen P. Penton, Costa Mesa, all of Calif.

[73] Assignee: McDonnell Douglas Corporation, Long Beach, Calif.

[21] Appl. No.: 551,269

[22] Filed: Feb. 20, 1975

[51] Int. Cl.² .................................................. B32B 3/00
[52] U.S. Cl. ........................................ 428/36; 156/180;
156/243; 156/245; 264/257; 264/258; 264/267;
428/47; 428/73; 428/116; 428/117; 428/178;
428/224; 428/446
[58] Field of Search .............. 264/257, 258, 267, 319,
264/DIG. 59, 248; 156/180, 181, 243, 245;
428/246, 247, 902, 298, 302, 36, 47, 73, 116,
117, 178, 224, 446

[56] References Cited

U.S. PATENT DOCUMENTS

| | | | |
|---|---|---|---|
| 2,999,780 | 9/1961 | Perrault | 264/314 |
| 3,075,249 | 1/1963 | Sucher | 264/DIG. 59 |
| 3,088,174 | 5/1963 | Ferndale | 264/258 |
| 3,093,160 | 6/1963 | Boggs | 264/258 |
| 3,349,157 | 10/1967 | Parsons | 264/258 |
| 3,779,851 | 12/1973 | Hertz | 156/161 |
| 3,784,664 | 1/1974 | Nicklin | 264/257 |
| 3,790,432 | 2/1974 | Fletcher et al. | 264/257 |
| 3,817,806 | 6/1974 | Anderson et al. | 264/257 |

*Primary Examiner*—James J. Bell
*Attorney, Agent, or Firm*—Max Geldin

[57] ABSTRACT

Stiffened structural components, particularly integrally stiffened light weight shell structures, produced by molding a stiffening member, preferably formed of a graphite-epoxy composition and having a so-called isogrid rib stiffening configuration, to a partially cured (B-stage) condition, injecting a suitable elastomer, e.g. a silicone, into the open spaces of the isogrid rib stiffener, to stabilize the partially cured composite during subsequent heat forming and curing operations, heat forming the resulting stiffening member to the required contour, e.g. for a cylinder into approximately 90° arcuate isogrid panels, heat forming the skin of the shell structure by laying up a plurality of layers of a pre-impregnated tape within a cylindrical mold, installing a plurality, e.g. four, of the heat formed isogrid stiffening panels into the interior of the skin, co-curing the skin and the isogrid panels to form an integral stiffened shell structure, removing the cylindrical mold from the co-cured stiffened shell structure and removing the elastomer from the spaces between the isogrid rib stiffeners.

32 Claims, 8 Drawing Figures

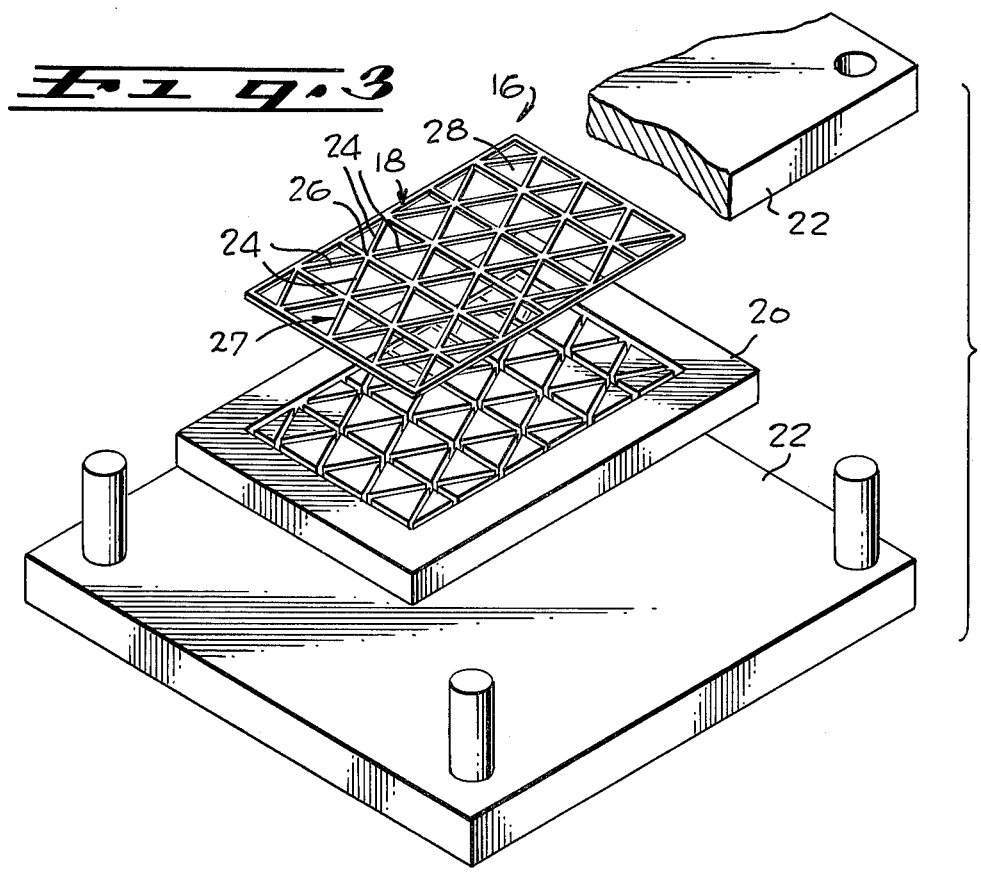
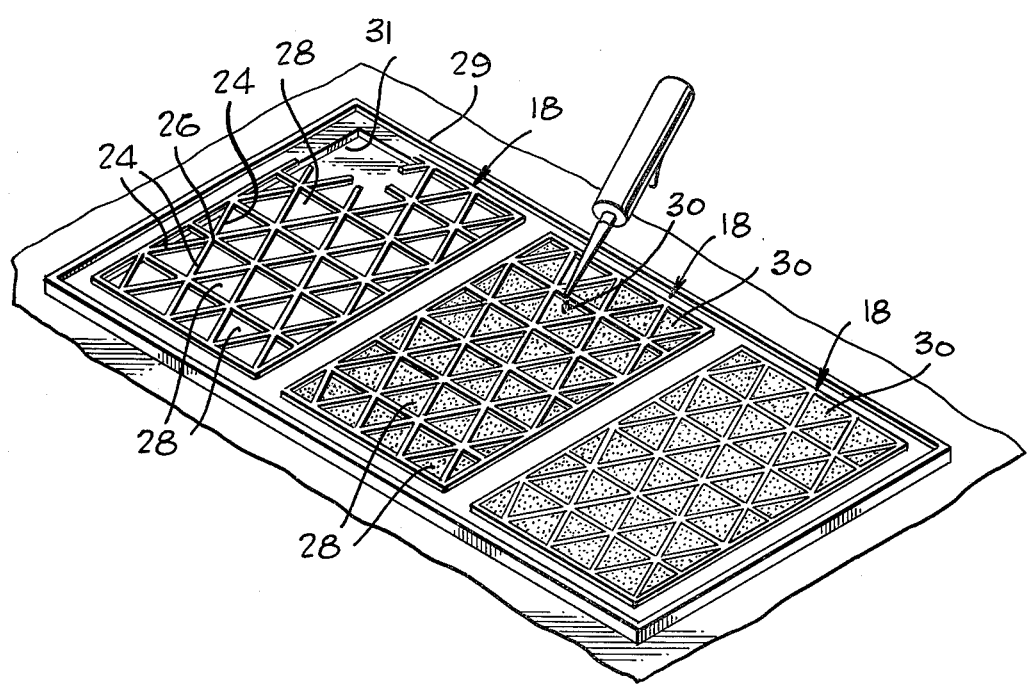

STIFFENED COMPOSITE STRUCTURAL MEMBER AND METHOD OF FABRICATION

BACKGROUND OF THE INVENTION

In general, in order to achieve high strength and efficiency, light weight shell or cylindrical structures must be stiffened with longerons and frames. Current design practices utilize mechanical means, such as rivets and bolts, or adhesive bonding to tie the structural elements together. It has been determined that structural components made with the least number of small stiffener parts substantially reduces the cost of the structure. However, in metal structures, in order to reduce the number of stiffener parts employed, it is necessary to integrally machine the stiffeners into the structural components or panels from thick metal plates.

The use of structural composites such as graphite-epoxy composites in structural components recently has assumed considerable importance as weight and stiffness become the motivating criteria for such designs. A recently introduced stiffening configuration called "isogrid" has been shown to result in a highly reduced weight structure, while providing sufficient stiffening. Generally such isogrid configurations are comprised of a plurality of webs or grids, such stiffening members being arranged in a pattern with the respective members oriented at an angle, e.g. 60°, to each other. The advantage of employing such an isogrid shear web as a stiffening member for structural components is that such a stiffener system can be manufactured at low cost in one piece from either metal or composites.

It is an object of the present invention to fabricate composite structural members employing isogrid stiffening. A particular object is to fabricate such composite structures employing compression molding coupled with co-curing, that is, simultaneous curing of stiffener and structural member, to integrally bond an isogrid stiffener or shear web to a structural component, for example the inside of a shell or cylinder, preferably also formed of a composite, particularly a composite comprised of layers of certain pre-impregnated tape.

DESCRIPTION OF THE INVENTION

The above objects and advantages are achieved, according to the invention, by integrating into the structural component formed of a composite, for example a pre-impregnated fabric laminate, all of the required stiffening and reinforcing material, such as isogrid stiffening panels, employing high modulus-high strength fibers, such as graphite fibers, and embedded in a resin matrix, such as an epoxy matrix, and finally co-curing the isogrid stiffening members or panels in contact with the composite structural components in a single curing operation. In such operation, the isogrid composite shear webs or stiffeners are preformed generally as flat composites in a partially cured state, then heat formed to the desired contour to match the structural component with which it is to be integrated, assembled into contact with the structural component to be stiffened, such as a shell, e.g. formed of a partially cured material such as a tape or laminate containing partially cured resin, and the resulting assembly cured to form the integrated structural component such as a structural shell or cylinder.

Thus, for example, the invention process includes as the principal fabrication steps for producing structural shells or cylinders, molding an isogrid stiffening member or preform composite to B-staging, heat forming the isogrid or stiffener composite to a predetermined contour, laying up and B-staging the outer cylindrical shell or skin, assembling the partially cured isogrid stiffener within the outer skin or shell and co-curing the assembly. Where the structural member with which the isogrid stiffener is to be integrated is a shape other than cylindrical or tubular, such as a flat structural component, the flat isogrid composite stiffener need not be heat formed to contour prior to co-curing the combined flat isogrid stiffener composite with the flat composite structural component. The resulting co-cured isogrid stiffened structural components provide high structural efficiency, the stiffened structural component formed of graphite-epoxy isogrid stiffeners and shell formed of pre-impregnated fabric laminate, such as an epoxy impregnated graphite fabric, has a structural efficiency comparable to beryllium. Such structures can be subjected to both axial compression loads and/or internal pressure loads. In addition, such co-cured isogrid stiffened structural components or shells result in lower cost for fabricating the structural components as compared to prior art stiffened structural components.

The invention will be more fully understood by the description below of a preferred embodiment, taken in connection with the accompanying drawings, wherein:

FIG. 3 illustrates production of a composite isogrid stiffener employed for fabricating the stiffened shell of FIG. 1;

FIG. 4 illustrates the step of injecting an elastomer such as silicone into the isogrid stiffening panels of FIG. 3;

Figure 6:
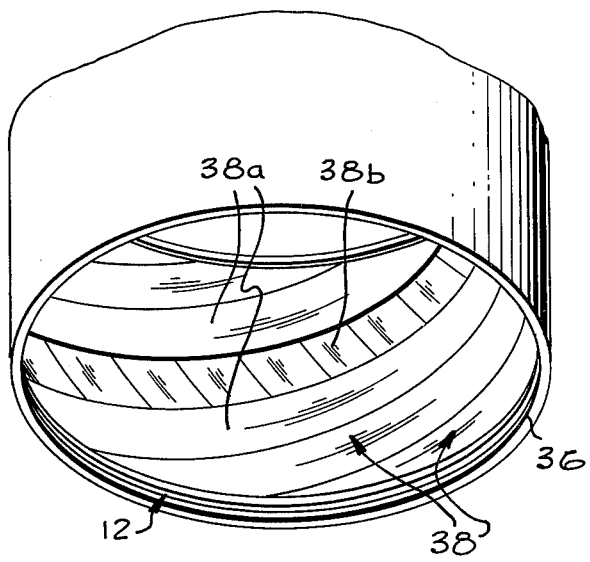
FIG. 6 shows the orientation of plies or layers of epoxy-impregnated graphite fabric, within a cylindrical mold.
Figure 7:
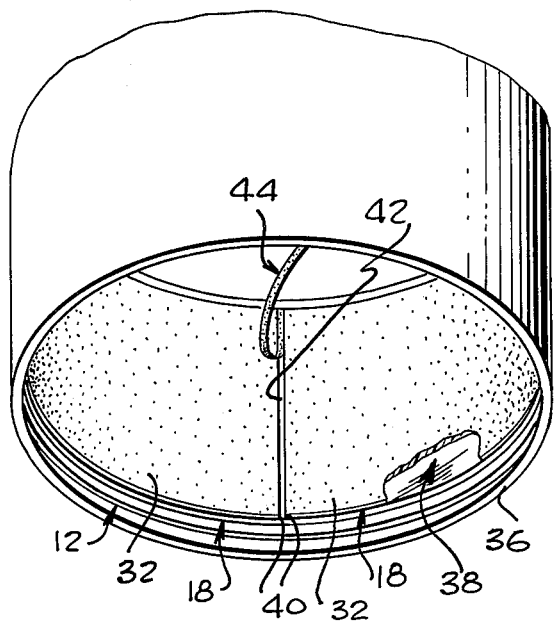
Figure 8:
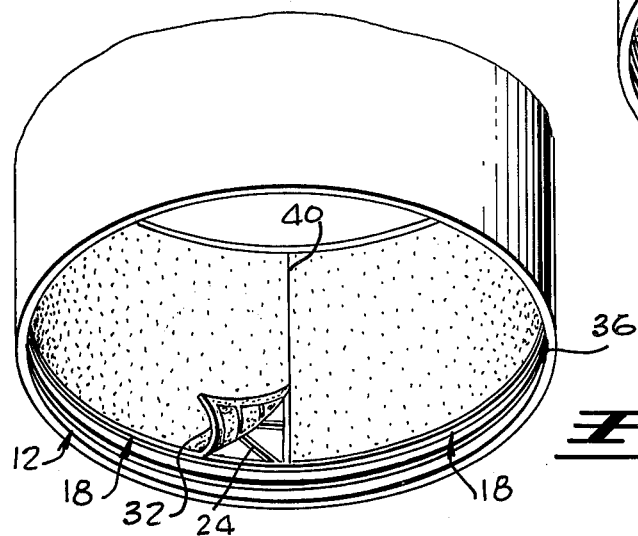

FIG. 7 shows a plurality of the elastomer filled isogrid stiffening panels illustrated in FIG. 4 positioned on the interior surface of the cylindrical skin formed by the epoxy impregnated graphite fiber laminate or fabric shown in FIG. 6, with strips of epoxy impregnated graphite laminate applied over the joints between adjacent edges of the isogrid stiffener panels; and FIG. 8 illustrates a modification of the procedure illustrated in FIG. 7.

Figure 1:
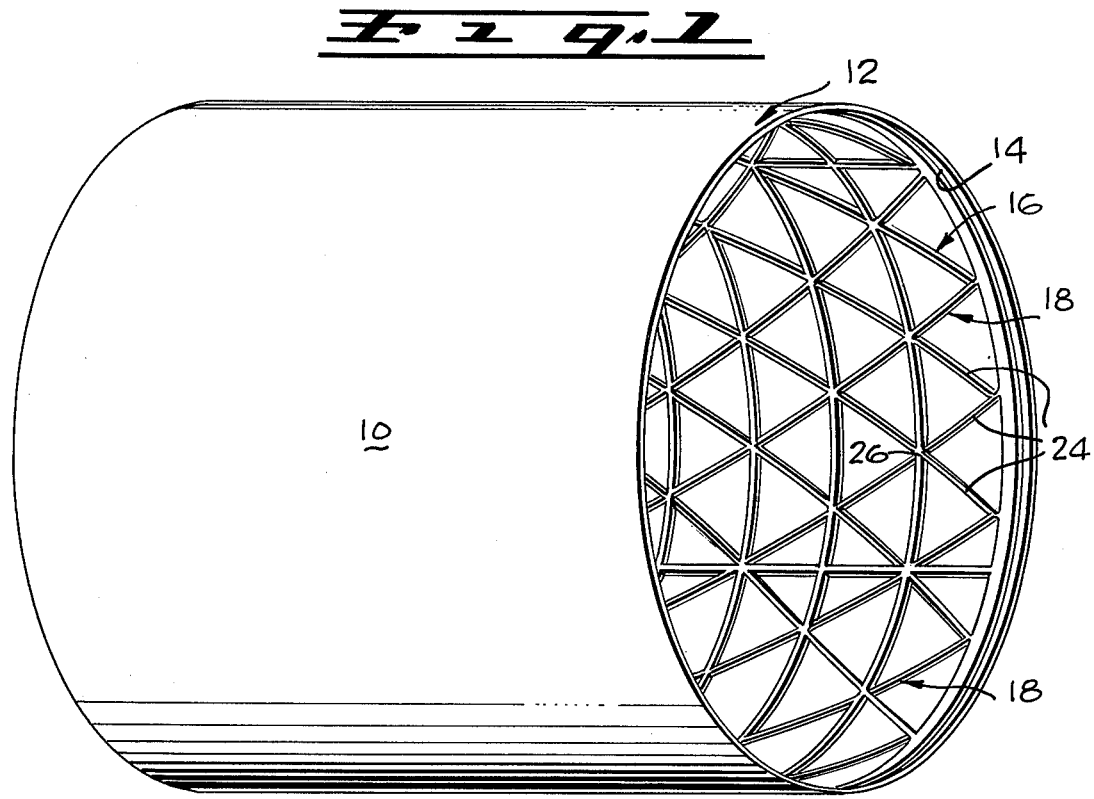
FIG. 1 is a view in perspective of a co-cured isogrid stiffened shell fabricated according to the invention.

Referring to FIG. 1, there is shown a co-cured isogrid stiffened structural shell 10 comprised of an outer composite shell 12, to the inner surface 14 of which is integrally connected a composite stiffener structure 16 formed of a plurality, particularly four in number, of individual composite arcuate isogrid stiffening panels or frames 18.

Figure 2:
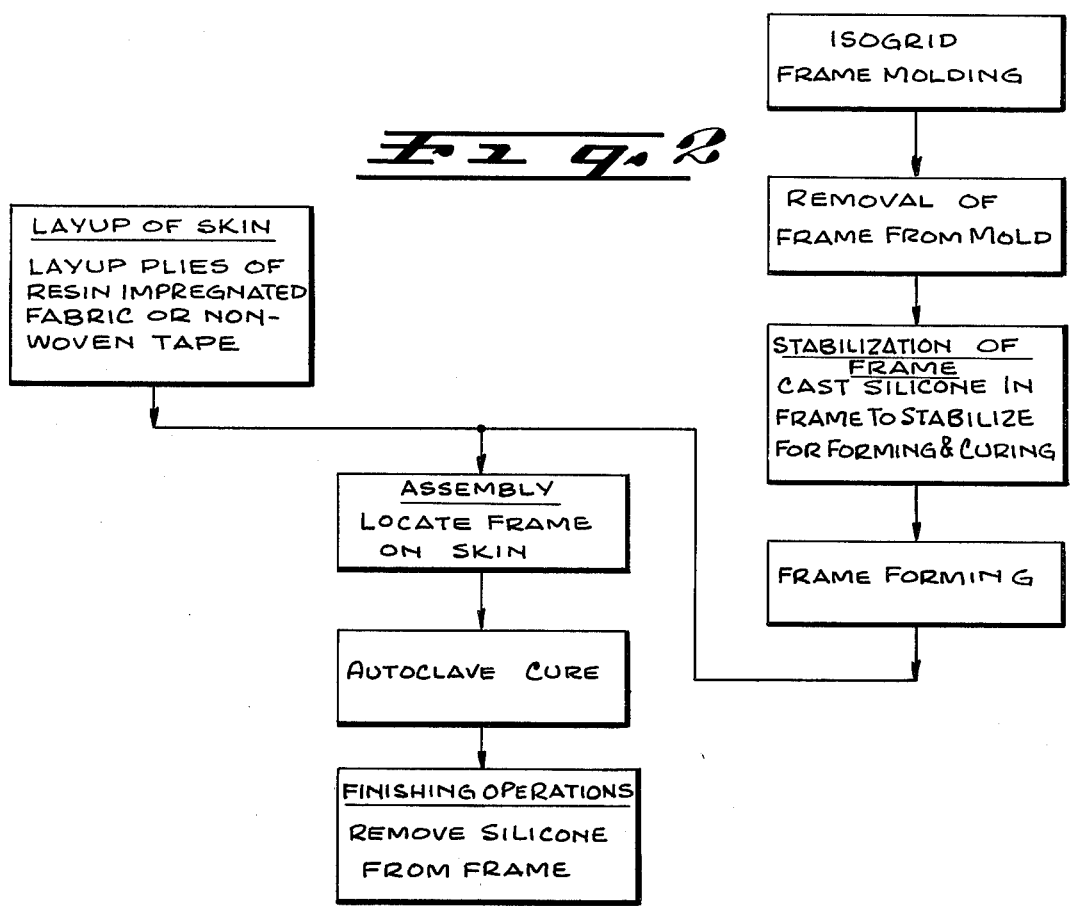
FIG. 2 is a fabrication flow diagram of the process for producing the stiffened structural shell of FIG. 1.

Now referring particularly to FIGS. 2 and 3 of the drawing, the isogrid stiffening structure or frame 18 is produced by compression molding reinforcing fiber and polymeric binder in a die 20 placed between platens 22 of a conventional molding press. Any suitable combination of high strength reinforcing fiber and organic polymeric binder to obtain a stiffening member of the required stiffness characteristics and modulus can be employed. Thus, for example, the reinforcing fibers can be boron, glass, graphite, nylon, polyimide fibers, and the like, and exemplary polymers which can be utilized as polymeric binder include epoxy, polyester, phenolic, polyimide, polyamide, polyurethane and polysulfone resins. Such fibers and polymers are understood as being exemplary only and other suitable fibers and polymers can also be employed. The preferred isogrid composite is a graphite-epoxy composite formed from graphite fibers and epoxy binder, e.g. chopped graphite fibers preimpregnated with epoxy resin, and particularly employing short fibers of about 0.25 to about 2 inches in length, and which are oriented within the isogrid substantially parallel to the plane of the isogrid. Preferred epoxies comprise the glycidyl ethers such as the glycidyl ethers of the phenols, and particularly those prepared by reacting a dihydric phenol with epichlorhydrin, e.g., the diglycidyl ether of bisphenol A.

The die 20 in the mold is first pre-warmed, e.g. to about 225° F. and is charged with the fiber-containing molding compound, e.g. a mixture of about 65% to about 70% of fibers such as graphite, and about 30% to about 35%, by weight of resin such as epoxy. The die is assembled between the platens 22 of a molding press (not shown) and the moding compound is B-staged, that is partially cured, in the platen press, e.g. at pressure of about 1500 to about 2,000 p.s.i. and at suitable temperatures, e.g. about 200° to about 250° F., typically for epoxy resin. The molded isogrid stiffening member 18 is then cooled and removed from the mold and excess resin or flash is removed from the part.

The preferred isogrid stiffening structure employed in producing a stiffened composite structural member such as a cylinder according to the invention, preferably is in the form of the isogrid shear web or shear panel 18 comprised of a plurality of interconnected structural members or webs 24 meeting at a common junction or nodal point 26, and oriented at 60° to each other, forming a triangular grid pattern 27, as illustrated in FIG. 3. This structural configuration of the isogrid stiffening member 18 has been found particularly advantageous as stiffeners for structural members such as cylinders, and can carry high shear loads and has high stability in a direction normal to the plane of the structure. The nodes or junctures 26 of the six structural members or webs 24 are ideally suited for a common attachment scheme and also serve as junction points for attaching another isogrid panel and also for tying the shear web or frame 18 to other frame members. Sufficient pressure is applied during molding so as to produce a dense isogrid stiffener, e.g. having a density ranging from about 0.054 to about 0.060, lb/cu.in., particularly whem employing a composite of graphite fibers and epoxy resin.

Preferably, in order to stabilize the B-stage or partially cured isogrid composite 18 during subsequent heat forming and final curing operations, a suitable elastomer such as liquid silicone resin, e.g. the material marketed as R.T.V. silicone resin, is injected into the open spaces 28 and around the periphery of the preform or panel 18, as seen in FIG. 4. In FIG. 4 three panels 18 are shown in the filling frame 29, the right hand panel 18 being shown full of elastomer, the center frame 18 being shown in the process of being filled with elastomer, and the left hand frame 18 shown prior to filling with elastomer. As seen particularly in the two right hand frames shown in FIG. 4, the silicone resin 30 fills the open spaces 28 between the webs 24 and in preferred practice, a layer 32 of silicone resin (see FIGS. 5 and 7) is applied to cover the under surfaces of the webs 24 and the isogrid stiffener members or panels 18. For this purpose, it will be seen in the left hand portion of FIG. 3, that a space 31 is provided in the bottom of the filling frame 29 into which the elastomer flows to form such layer 32. The silicone elastomer in the panels 18 is allowed to cure for a period, e.g. of about 24 hours, and such cure can be augmented with a 2 hour oven cure at 125° F. Such temperature is insufficient, however, to cause any significant further curing of the partially cured epoxy-graphite composite frames or panels 18.

It will be understood that elastomers other than silicone elastomers, can be employed for stabilizing the isogrid stiffeners or panels 18. The requirements for the elastomers are: (1) preferably room temperature curing, (2) good release from the cured isogrid, (3) flexibility, and (4) compatibility with the elevated temperature of curing in subsequent curing operations. Usually, it has been found that without the use of such stabilizing resins incorporated into the spaces between the webs of the isogrid panel, the partially cured composite panel 18 tends to soften and flow and lose its structural shape during the subsequent heat forming and curing operations.

Figure 5:
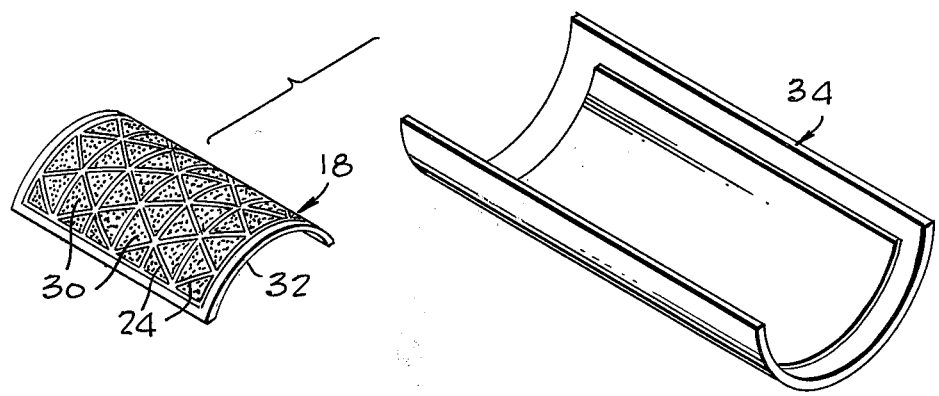
FIG. 5 illustrates the step of heat forming the elastomer filled isogrid stiffener panels of FIG. 4, into an arcuate shape or configuration, with the forming tool employed in such heat forming.

The composite isogrid panel 18, preferably containing the elastomer, e.g. silicone resin, stabilizer, is then placed on a suitable forming tool such as the arcuate metal, e.g. aluminum, forming tool 34 seen in FIG. 5. The assembly of the forming tool 34 with the isogrid stiffener panel 18 placed against the concave interior surface of the tool, is provided with a first conventional envelope vacuum bag and vacuum fitting (both not shown) positioned against frame or preform 18, and a second vacuum bag (not shown) against the tool, and the entire assembly is placed in an oven preheated to forming temperature, e.g. about 200° F. When the part 18 reaches the required temperature of about 200° F., a vacuum is drawn causing the preform or isogrid panel 18 to form to the curvature of the concave inner surface of tool 34, following which the vacuum is turned off and the assembly allowed to cool to room temperature, and the resulting preform or the isogrid panel 18 having an arcuate shape as seen in FIG. 5, is removed from the forming tool. It is noted that the temperature of the panel 18 during such forming operation is again insufficient to produce any significant further curing of the initially partially cured epoxy-graphite composite isogrid frame or panel 18.

Referring to FIG. 6, the cylinder or shell 12 which is to be stiffened and reinforced by the isogrid panel members 18 is formed of layers or plies 37 of resin impregnated non-woven fibers or fabric, e.g. in the form of a tape. The fibers and resin impregnant employed for this purpose can be the same, respectively, as those noted above for producing the isogrid composite panel 18. A preferred combination of fibers and resin for this purpose is in the form of woven graphite fabric or non-woven tape impregnated with epoxy resin in partially cured or B-staged condition, laid up in plies or layers, as a laminate, and forming the outer skin or shell 12 reinforced by an interior assembly of the isogrid panels 18, as described in greater detail below.

In preparing such laminate or layup for producing the outer cylindrical skin or shell, a cylindrical mold 36 is preferably first spray coated on its internal surface with a conventional release agent such as the material marketed as Frecoat 33 release agent, which is baked into the internal surface of the cylinder, e.g. at a temperature of about 300° F. for 1 hour. Other suitable release agents can be employed. A plurality of plies or layers 38 of pre-impregnated tape formed from a woven graphite fabric or non-woven tape impregnated with epoxy resin is laid in successive layers around the periphery of the interior surface of the cylindrical mold 36, each of the adjacent plies 38 being oriented at different angles, e.g. at 45° or 90° to each other, as indicated at 38a and 38b. This is accomplished by laying up the first circumferential tape in the mold 36, placing a vacuum bag inside the resulting circumferential ply, drawing a vacuum and warming the interior to a temperature of about 100° to 120° F., to tack or adhere the first circumferential ply 38 to the cylindrical mold 36. Thereafter, the vacuum bag is removed, the assembly cooled and additional plies of epoxy impregnated graphite woven fabric or non-woven tape are laid with selected orientation around the interior of mold 36. A vacuum bag is then installed within the resulting layup or laminate 12, and the entire assembly is then placed in an air circulating oven and heated at a temperature of about 225° F. and under vacuum to a tack free state.

Now referring particularly to FIG. 7 of the drawing, there is illustrated the next step of the process which consists of assembling a plurality of the elastomer-filled, e.g. silicone filled, partially cured epoxy-graphite composite isogrid panels 18 into the epoxy-graphite laminate or skin 12 adhered to the inner surface of the cylindrical mold 36. In this operation, four isogrid panel members or preforms 18, each of which are formed into an approximately 90° arc, are required to cover the entire inner surface of the layup of fiber-impregnated resin plies forming the cylindrical skin 12. Preferably, the interior of skin 12 is sprayed with an epoxy resin in a solvent solution and allowed to first dry over night. The four isogrid panels 18 are then fitted to the interior of the skin 12 so that the adjacent edges 40 of adjacent panels 18 are in closely adjacent or contiguous alignment with each other, the outer concave surfaces of the isogrid panels 18 containing the outer layer 32 of cured silicone resin. In preferred practice, although not necessary, a narrow strip 42 of silicone resin is cut away along adjacent contiguous edges of the adjacent isogrid panels 18, to expose adjacent edges 40 of panels 18, and a so-called doubler strip 44 formed of layers of graphite-epoxy cloth or of the same pre-impregnated epoxy-graphite tape as the plies 38 of cylindrical laminate or skin 12, is laid up over the cut-out strip 42 of the silicone resin layer 32. Such joint doublers can then be covered, e.g. with a silicone rubber strip (not shown) and taped to the adjacent layers 32 of silicone resin by means of Mylar tape. Such doublers function to provide additional strength to the joint area if required. However, it will be understood that the removal of strip 42 and the use of doublers such as 44 over the joints between the adjacent isogrid panels 18 is not necessary, as illustrated in the modification shown in FIG. 8.

The resulting assembly shown in FIG. 7 or FIG. 8, with vacuum bag (not shown) placed against the inner surface 32 of the assembled panels 18 within mold 36, is placed in an autoclave, and the assembly formed of outer laminate or skin 12 and the four isogrid panels 18 fitted into close contact with the interior surface of skin 12, is cured at autoclave pressures of about 100 p.s.i. and at temperature of about 350° F. for about 3 hours to co-cure or simultaneously cure in a single operation the composite isogrid panels 18 and the composite shell or skin 12 into an integral form. The assembly is then cooled and removed from the autoclave. Such assembly is then placed in a suitable tool such as an arbor press and the finally cured assembly of the outer cylindrical skin or shell 12 with the four finally cured isogrid panels 18 integrally secured to such outer skin, is removed from the cylindrical mold 36.

The resulting stiffened structural member or composite shell structure 10 as shown in FIG. 1, can be applied as a structural cylindrical component which is reinforced and stiffened for use by the isogrid stiffener panels 18 in a variety of applications. Potential uses of such stiffened composite shell include application as (a) underwater containers for communication devices, detection devices, torpedoes, explosives, and mines; (b) tanks which are subjected to external pressures and bending loads; (c) non-metallic tank cars and trucks; (d) rapid transportation cars; (e) helicopter tail booms; (f) structural shells for re-entry and defense missiles; (g) flight structure for small aircraft or drones; (h) launch vehicle structure; (i) structural shells for buildings; (j) towers, and (k) boat shell structure and superstructure.

As previously noted, in preferred practice an elastomer is employed to fill the spaces 28 in the isogrid panel 18 and to form a thin layer thereover for stabilization of the partially cured isogrid panel during heat forming and final cure. Without such elastomer, it has been found that the partially cured composite 18 tends to soften and flow during such heat forming and final curing operations.

Accordingly, following final cure and removal of the finished composite structural shell 10 from the cylindrical mold 36, the elastomer or layer of silicone resin 32 and the attached portions of the cured silicone resin 30 in the spaces between the webs 24 of the panels 18, is removed simply by peeling the silicone layer 32 and attached silicone portions 30 away from the respective isogrid panels 18.

Although the isogrid panels 18 are shown as formed in arcuate shape for fitting over the interior surface of a cylindrical composite, it will be understood that such isogrid panels can be formed into any desired shape, including use of the flat grid panels 18 as seen in FIG. 3, directly as stiffeners adhered to or rendered integral with a structural member of corresponding shape, such as flat outer panels or skins.

From the foregoing, it is seen that the invention provides relatively simple procedure for forming integrally stiffened structural composites, particularly co-cured integral composites such as cylinders, with fiber-resin bonded isogrid panels. The invention concept includes the production of an isogrid panel using oriented short fibers for maximum strength characteristics in the isogrid panel or preform, and particularly an internal isogrid reinforcement structure arranged in triangles to produce isotropic panel characteristics, use of compression molding techniques to form the isogrid partially cured composite, use of an elastomer such as a silicone for stabilization of the isogrid panels during heat forming and final curing, heat forming of isogrid panels to curve panels to match the skin contour, and final cure of the total structure including the stiffening isogrid panels mated to the outer skin, and such skin, in a single curing operation. The invention has the further advantages of avoiding adhesive bonding operations for connecting the stiffening members to the structural component and provides relatively simple and economical procedure facilitating integral attachment of the stiffening members or panels to the structural component.

While we have decribed particular embodiments of the invention for purposes of illustration, it will be understood that various changes and modifications can be made therein within the spirit of the invention, and the invention accordingly is not to be taken as limited except by the scope of the appended claims.

What is claimed is:

1. A process for producing a stiffened structural member which comprises molding a stiffening member formed of a composite of reinforcing fibers and polymeric binder to a partially cured stage, said stiffening member comprised of interconnected webs forming a grid pattern, producing a composite structural member formed of partially cured polymer-impregnated fiber, heat forming said partially cured composite stiffening member to a contour matching the contour of said structural member, said heat forming taking place without any substantial further curing of said composite stiffening member, assembling said composite stiffening member in contact with said composite structural member, and finally curing simultaneously said composite stiffening member and said composite structural member of said assembly to integrally bond said stiffening member to said structural member, and including introducing an elastomer into the spaces of said grid pattern following molding thereof and prior to heat forming, said elastomer maintaining said partially cured composite stiffening member stabilized during said heat forming and final curing steps, and removing said elastomer after final curing.

2. The process as defined in claim 1, said stiffening member comprised of interconnected webs radiating from a common nodal point and forming a triangular grid pattern.

3. The process as defined in claim 1, said stiffening member formed of a composite of reinforcing fibers selected from the group consisting of boron, glass, graphite, nylon and polyimide fibers, and said polymeric binder selected from the group consisting of epoxy, polyester, phenolic, polyimide, polyamide, polyurethane and polysulfone resins.

4. The process as defined in claim 1, said structural member formed of a laminate of layers of fabric selected from the group consisting of boron, glass, graphite, nylon and polyimide fabric, impregnated with a polymer selected from the group consisting of epoxy, polyester, phenolic, polyimide, polyamide, polyurethane and polysulfone.

5. The process as defined in claim 3, said structural member formed of a laminate of layers of fabric selected from the group consisting of boron, glass, graphite, nylon and polyimide fabric, impregnated with a polymer selected from the group consisting of epoxy, polyester, phenolic, polyimide, polyamide, polyurethane and polysulfone.

6. The process as defined in claim 1, said stiffening member formed of a composite of short reinforcing fibers selected from the group consisting of boron, glass, graphite, nylon and polyimide fibers, and said polymeric binder selected from the group consisting of epoxy, polyester, phenolic, polyimide, polyamide, polyurethane and polysulfone resins, said structural member formed of a laminate of layers of fabric selected from the group consisting of boron, glass, graphite, nylon and polyimide fabric, impregnated with a polymer selected from the group consisting of epoxy, polyester, phenolic, polyimide, polyamide, polyurethane and polysulfone.

7. The process as defined in claim 2, said stiffening member formed of a composite of short reinforcing fibers selected from the group consisting of boron, glass, graphite, nylon and polyimide fibers, and said polymeric binder selected from the group consisting of epoxy, polyester, phenolic, polyimide, polyamide, polyurethane and polysulfone resins, said structural member formed of a laminate of layers of fabric selected from the group consisting of boron, glass, graphite, nylon and polyimide fabric, impregnated with a polymer selected from the group consisting of epoxy, polyester, phenolic, polyimide, polyamide, polyurethane and polysulfone.

8. A process for producing a stiffened structural member which comprises molding a stiffening member formed of a composite of reinforcing fibers and polymeric binder to a partially cured stage, said stiffening membember comprised of interconnected webs forming a grid pattern, producing a composite structural member formed of partially cured polymer-impregnated fiber, assembling said composite stiffening member in contact with said composite structural member, and finally curing simultaneously said composite stiffening member and said composite structural member of said assembly to integrally bond said stiffening member to said structural member, and including introducting an elastomer into the spaces of said grid pattern prior to said final curing, said elastomer maintaining said partially cured composite stiffening member stabilized during said final curing.

9. A process for producing a stiffened structural member which comprises molding a stiffening member formed of a composite of reinforcing fibers and polymeric binder to a partially cured stage, said stiffening member comprised of interconnected webs radiating from a common nodal point and forming a triangular grid pattern, producing a composite structural member formed of partially cured polymer-impregnated fiber, assembling said composite stiffening member in contact with said composite structural member, and finally curing simultaneously said composite stiffening member and said composite structural member of said assembly to integrally bond said stiffening member to said structural member, said stiffening member formed of a composite of short reinforcing fibers selected from the group consisting of boron, glass graphite, nylon and polyimide fibers, and said polymeric binder selected from the group consisting of epoxy, polyester, phenolic, polyimide, polyamide, polyurethane and polysulfone resins, said structural member formed of a laminate of layers of fabric selected from the group consisting of boron, glass, graphite, nylon and polyimide fabric, impregnated with a polymer selected from the group consisting of epoxy, polyester, phenolic, polyimide, polyamide, polyurethane and polysulfone, including injecting an elastomer into the spaces of said grid pattern prior to said final curing, said elastomer maintaining said partially cured composite stiffening member stabilized during said final curing, and removing said elastomer from said fully cured composite stiffening member following said final curing.

10. The process as defined in claim 4, wherein said stiffening member is formed of a composite of graphite fibers and partially cured epoxy, and said structural member is formed of a plurality of layers of graphite fabric impregnated with partially cured epoxy.

11. The process as defined in claim 7, wherein said stiffening member is formed of a composite of short chopped graphite fibers and partially cured epoxy, and said structural member is formed of a plurality of layers of graphite fabric impregnated with partially cured epoxy.

12. The process as defined in claim 9, wherein said stiffening member is formed of a composite of graphite fibers and a partially cured epoxy, and said structural member is formed of a plurality of layers of graphite fabric impregnated with partially cured epoxy.

13. The process as defined in claim 12, wherein said elastomer is a silicone elastomer.

14. A process for producing a light weight stiffened shell structure which comprises molding an isogrid preform functioning as stiffening member, by placing a molding compound formed of reinforcing fibers admixed with a polymeric binder in a press, and subjecting said molding compound to heat and pressure sufficient to partially cure said compound and forming a substantially planar composite having the configuration of interconnected webs radiating from a common nodal point and forming a triangular grid pattern, forming said composite under heat and pressure on a forming tool, into an arcuate shape, laying up a plurality of layers of fiber impregnated with a partially cured polymer within a cylindrical mold to form a cylindrical outer skin or shell, placing a plurality of said arcuately shaped isogrid composite preforms in contact with the interior surface of said outer skin within said cylindrical mold and substantially completely covering said skin with said isogrid preforms, subjecting said assembly of isogrid preforms in contact with said outer skin to heat and pressure sufficient to cure said isogrid preforms and said outer skin substantially simultaneously to an integral finally cured stiffened shell structure, and removing said shell structure from said cylindrical mold, and including injecting an elastomer into the spaces of said grid pattern following molding thereof and prior to heat forming, sais elastomer maintaining said partially cured isogrid preform composite stabilized during said heat forming and final curing steps, and removing said elastomer after final curing to form said stiffened shell structure.

15. A process as defined in claim 14, including injecting sufficient said elastomer to form an outer layer of said elastomer over said isogrid preform, and peeling said layer of elastomer together with elastomer portions disposed in the spaces of said grid pattern, from said isogrid preforms after said final curing.

16. A process as defined in claim 15, including stripping elastomer from adjacent edges of isogrid preforms following placement of said preforms adjacent said outer skin within said cylindrical mold and covering said stripped edges with a laminate of the same composition as said outer skin prior to said final curing.

17. A process as defined in claim 14, said partially cured composite isogrid preforms being heat formed into 90°. arcuate configurations, four of said preforms being arranged in side by side contiguous relation around the interior surface of said skin, prior to said final curing.

18. A process as defined in claim 14, said isogrid preforms each being formed of a composite of reinforcing fibers selected from the group consisting of boron, glass, graphite, nylon and polyimide fibers, and said polymeric binder selected from the group consisting of epoxy, polyester, phenolic, polyimide, polyamide, polyurethane and polysulfone resins.

19. A process as defined in claim 18, said outer skin formed of a laminate of layers of fabric selected from the group consisting of boron, glass, graphite, nylon and polyimide fabric, impregnated with a polymer selected from the group consisting of epoxy, polyester, phenolic, polyimide, polyamide, polyurethane and polysulfone.

20. A process as defined in claim 14, wherein said isogrid preforms are each formed of a composite of graphite fibers and partially cured epoxy, and said outer skin is formed of a plurality of layers of graphite fabric impregnated with partially cured epoxy, adjacent layers being disposed at an angle to each other.

21. A process as defined in claim 17, wherein said isogrid preforms are each formed of a composite of short chopped graphite fibers and partially cured epoxy, and said outer skin is formed of a plurality of layers of graphite fabric impregnated with partially cured epoxy, adjacent layers being disposed at varying angles to each other.

22. A process as defined in claim 15, wherein said elastomer is a silicone elastomer.

23. A process as defined in claim 14, wherein said elastomer is a silicone elastomer.

24. A stiffened composite structural member, produced by the process of claim 1.

25. A stiffened composite structural member, produced by the process of claim 2.

26. A stiffened composite structural member, produced by the process of claim 5.

27. A stiffened composite structural member, produced by the process of claim 7.

28. A stiffened composite structural member, produced by the process of claim 11.

29. A stiffened composite structural member, produced by the process of claim 14.

30. A stiffened composite structural member, produced by the process of claim 17.

31. A stiffened composite structural member, produced by the process of claim 21.

32. A stiffened composite structural member, produced by the process of claim 23.

* * * * *